Sept. 10, 1946.  A. F. HOESEL  2,407,606
INTERNAL-COMBUSTION ENGINE
Filed July 26, 1944  3 Sheets-Sheet 1
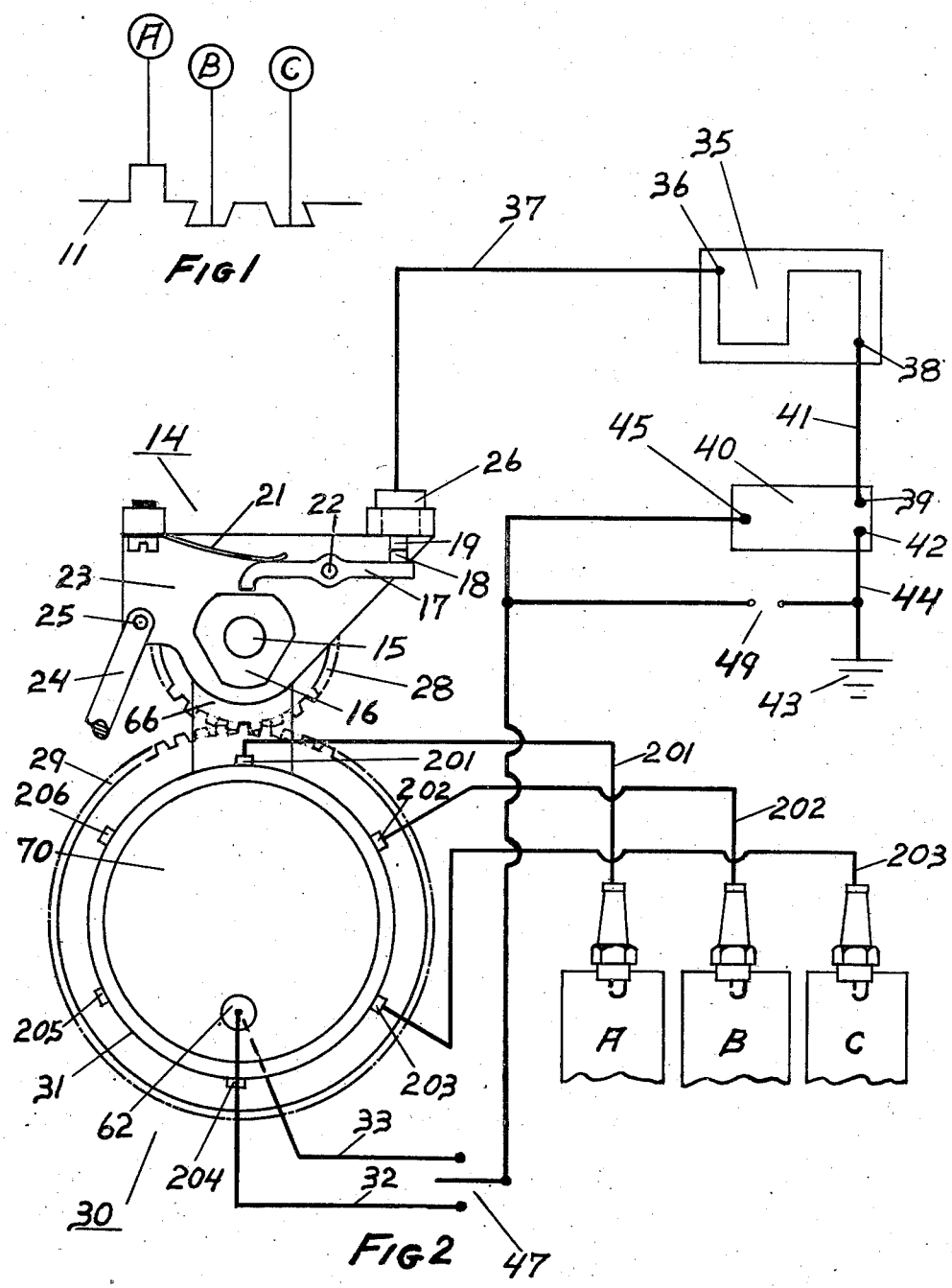
INVENTOR
Anthony F. Hoesel

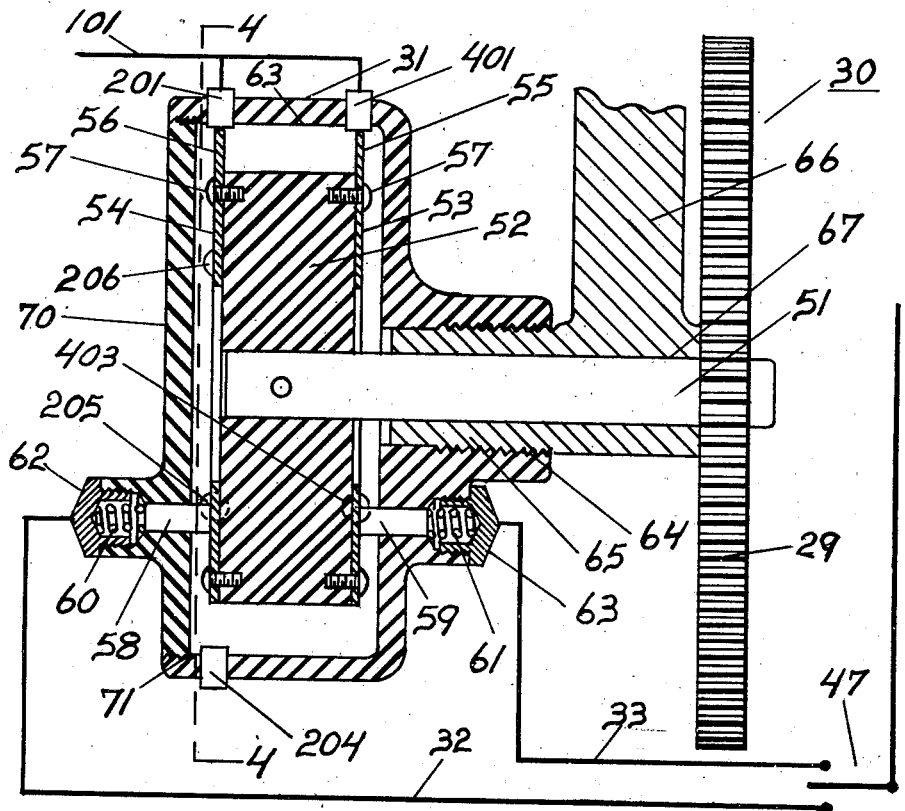
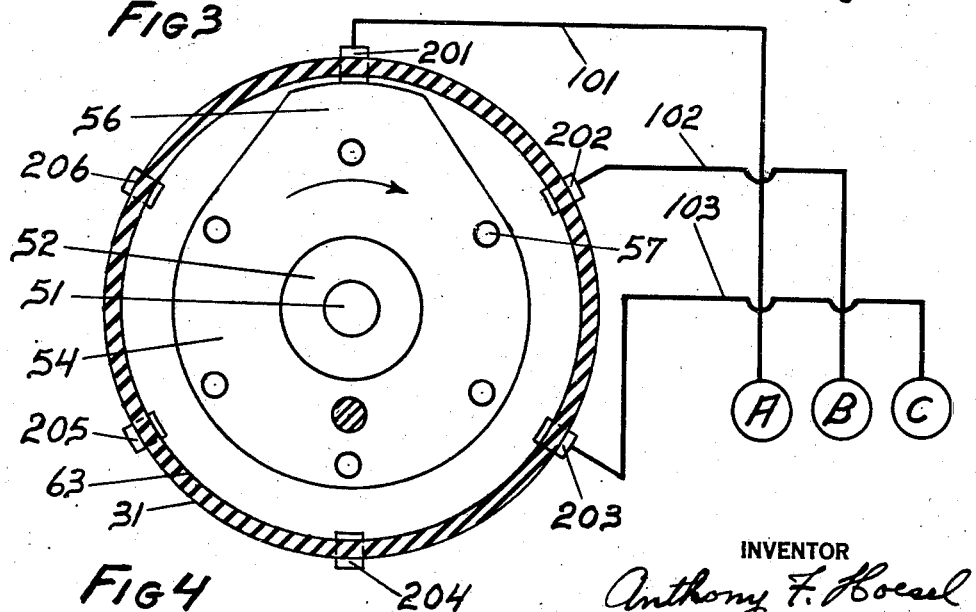

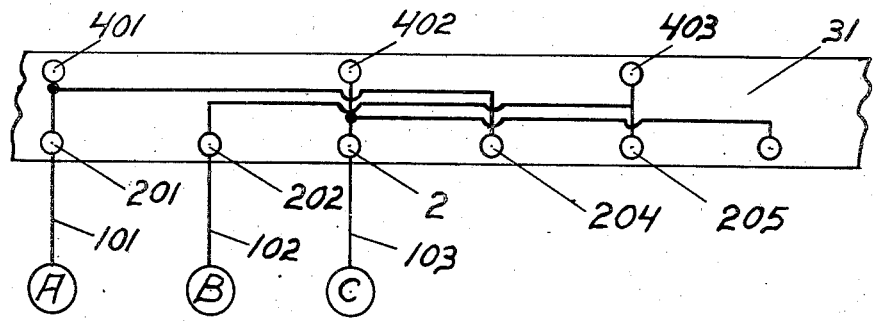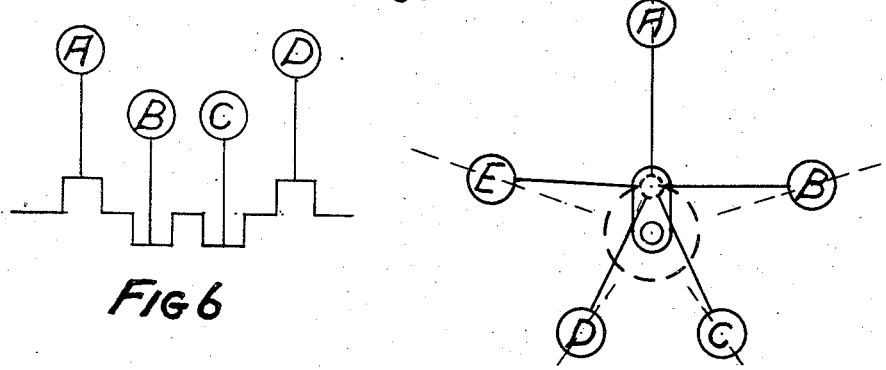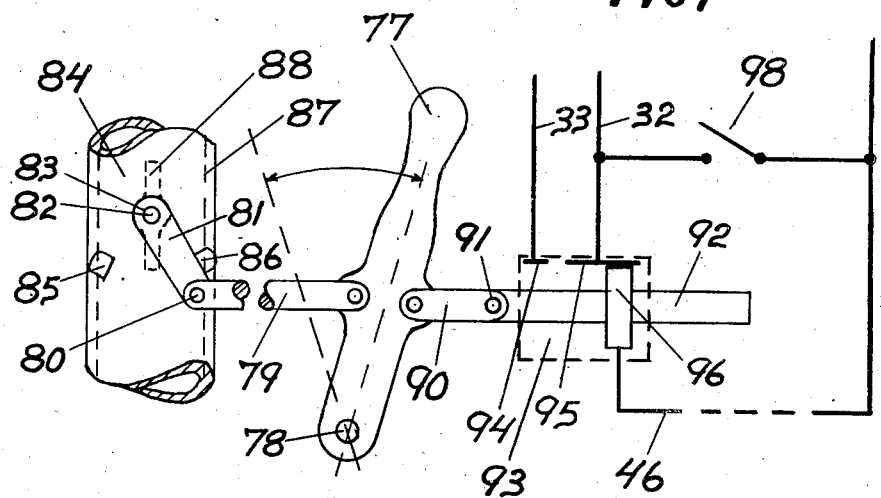

Patented Sept. 10, 1946

2,407,606

UNITED STATES PATENT OFFICE 2,407,606

INTERNAL-COMBUSTION ENGINE

Anthony F. Hoesel, Chicago, Ill.

Application July 26, 1944, Serial No. 546,591

3 Claims. (Cl. 123—21)

The present invention relates to internal combustion engines of the two stroke cycle type and specifically relates to a novel means for throttling the same to a low R. P. M.

In the four stroke cycle conventional engine, the fuel-air ratio is kept substantially constant and speed reduction is accomplished by throttling the amount of intake to the cylinder. At the completion of the discharge stroke, the compression space is generally occupied by products of the previous combustion which mix with the incoming mixture, during the intake stroke. Assuming an engine with a 6–1 compression ratio, we could theoretically figure, under wide open throttle, a 14% contamination of the intake mixture. As we now progressively throttle the engine, the contamination progressively increases until, at say 84% throttle, we have a 50% contamination.

Obviously, there must be some point where the contamination is sufficient to prevent ignition of the mixture. This is the main cause of such engines continuously missing fire at reduced speeds.

What actually occurs, taking the immediately preceding condition as an example, is that the 50% contaminated mixture does not ignite and, at the succeeding piston discharge stroke end, the compression space is filled with a 50% contaminated mixture.

During the next intake stroke, the engine sucks in a fuel-air mixture of practically equal volume to that of the volume of the compression space and the total mixture then becomes only 25% contaminated. If this contamination is insufficient to prevent ignition, the engine then operates on what may be called an eight stroke cycle. If the contamination is still too great, the engine might then operate for another complete cycle in which the contamination might be reduced to 12½%.

The above would not be a serious condition, of engine operation, if it were not for the fact that such mixtures, especially those highly contaminated, have a very slow rate of combustion, which allows burning of the same, in the cylinders and exhaust pipe, during the exhaust and intake strokes of the piston. That is the reason that highly throttled engines tend to back fire through the carburetor and/or to explode in the exhaust pipes, which is a highly common phenomenon.

Such back-fires disturb the normal fuel-air ratio, within the carburetor manifold, and further affect the engine. The operation becomes very jerky and the engine may finally stop.

The above relates to the four stroke cycle type engine and is further magnified in the two stroke cycle type engine, which is notorious for poor throttling characteristics, and which has had poor acceptance in part, because of such reason.

Assuming a conventional two stroke cycle engine, of the ported type, we have a power stroke, which, adjacent the end thereof, uncovers firstly the exhaust discharge ports and secondly the intake ports to the cylinder for the passage of a precompressed fuel-air mixture within the crankcase.

It is important to remember that, previous to the uncovering of the intake ports, the entire cylinder volume is filled with combustion products.

During the normal wide open throttle operation, of the conventional two stroke cycle type engine, the piston travel creates equal volumetric displacements in both the cylinder and the crankcase, therefore, in theory at least, the two stroke cycle engine, during wide open throttle and for equivalent compression ratios, has exactly the same contamination, of the fuel-air mixture, as the four stroke cycle engine has.

Supposing we now throttle this two stroke cycle engine down to the same volumetric fuel-air mixture, which gave a 50% contamination in the four stroke cycle engine. What percent contamination can we then expect?

The cylinder has a 100% volume of combustion products at the end of the power stroke and the crankcase now contains 16% volume of the total piston displacement or, to put it another way, for 6–1 compression ratio, the total cylinder volume is 7 unit volumes, the piston displacement, within both the cylinder and crankcase is 6 unit volumes, and the mixture intake, under the particular throttle conditions, to the crankcase from whence it is transferred, after precompression, to the cylinder, is of 1 unit volume.

Under this condition, we mix 1 unit volume of fuel-air mixture with 6 unit volumes of combustion products, since the passage of 1 unit volume of fuel-air mixture, to the cylinder, pushes out 1 unit volume of combustion products therefrom.

The ratio of fuel-air mixture to combustion products now is 1 to 6 and the contamination is 83% instead of 50% formerly.

Whenever the throttling is sufficiently reduced, so that the contamination is insufficient to prevent ignition, the volumetric amount, of fuel-air mixture is sufficiently great to impart an amount of power which will rapidly rotate the engine. Even at this point there may frequently occur crankcase back-fires with their attendant upsetting results.

This is the reason why conventional two stroke cycle engines cannot be throttled to the same values as conventional four stroke cycle engines.

I propose operating internal combustion engines, of the two stroke cycle type, with a modified cycle under conditions of reduced load and speed as hereinafter set forth.

An object of the present invention is to modify the normal load operating cycle of two stroke cycle internal combustion engines, during the operation of the engine at reduced load and/or speed.

Another object of the present invention is to provide a simple means of modifying engine cycles so that the engine may be readily throttled without producing back-fires and exhaust manifold explosions.

Further objects of the present invention will be disclosed in the following specification and claims which are a clear and concise exposition of the invention.

In the drawings:

Fig. 1 is a diagrammatic illustration of the crank system of a three cylinder in line two stroke cycle engine.

Fig. 2 is a diagrammatic illustration of an ignition system used in the practice of the invention.

Fig. 3 is a view, partly in cross-section of the high tension current distributor of Fig. 1.

Fig. 4 is a view, along line 4—4 of Fig. 3.

Fig. 5 is a straight line development, of the circumference of the distributor head Figs. 3 and 4, showing the relative positioning of the various contacts carried thereby and their interconnections.

Fig. 6 is a diagrammatic illustration of the crank system of a four cylinder in line two stroke cycle engine.

Fig. 7 is a diagrammatic illustration of the crank system of a five cylinder radial two stroke cycle engine.

Fig. 8 illustrates, diagrammatically, a single lever control system for simultaneously controlling both the fuel feed rate, to an engine, and the firing sequence thereof.

Referring to the drawings:

In Fig. 1, we have a three throw 120° angle crank shaft 11 which reciprocates pistons in the cylinders A, B and C operated, while under speed, on the two stroke cycle. The firing order, then, is A—B—C—A—B—C—A and the power strokes are at 120° intervals. In order to utilize my invention, I contemplate, at relatively low speeds, operating this engine with a power stroke for every four piston strokes, and in order to preserve a constant interval, between the power strokes, I shall change the firing order to A—C—B—A at 240° intervals.

In Fig. 2, the circuit breaker assembly 14 comprises a shaft 15 driven at crank-shaft speed and mounting a three lobe cam 16, which oscillates the rocker arm 17, in timed relation to the pistons of the engine, and makes and breaks an electrical circuit between the contact 18, mounted upon the rocker arm 17, and the stationary contact 19.

A spring 21 constantly urges the rocker arm 17, which is fulcrumed at 22, toward the cam 16.

The shiftable rocker plate 23, controlled by the shift rod 24 fulcrumed at 25, mounts the fulcrum 22 and an insulating member 26 carrying the stationary contact 19. Shifting the rocker plate 23 allows the making and breaking of an electrical circuit, between the contacts 18 and 19, at different angularities of the cam 16.

The shaft 15 also mounts a gear wheel 28 meshing with the gear wheel 29 of the high tension current distributor assembly 30.

The gear wheel 29 has twice the number of teeth that the gear wheel 28 has and consequently is driven at half the speed of the shaft 15.

The stationary distributor head 31, made of insulating material, shows, in this view, high tension current conduit lead ins 32 and 33 and high tension current conduit lead outs 101, 102 and 103 connected to spark plugs in the cylinders A, B and C respectively.

A storage battery 35 has its pole 36 connected to the stationary contact 19 by means of the conduit 37, and its other pole 38 connected to the post 39 of the primary current circuit of the spark coil 40 by means of the conduit 41. The post 42 connects to the ground 43 by means of the conduit 44.

The high tension current post 45 is connected, with a conduit 46, to the single pole double throw switch 47 through which a current flow may be established in either of the conduits 32 or 33.

Interposed, between the conduits 44 and 46, is a spark gap 49 for leading off high tension current, to the ground 43, whenever such current is generated and not distributed to the spark plugs of the engine.

In Figs. 3 and 4, the gear wheel 29 drives the shaft 51 upon which is mounted and driven thereby, an insulating distributor rotor 52 having similar shaped metallic conductor washers 53 and 54, with spark lead off extensions 55 and 56 respectively, by means of screws 57. Carbon brushes 58 and 59, backed by springs 60 and 61 retained by the metallic spring retainers 62 and 63, serve to convey high tension current from the conduit 32 or 33 to the conductor washers 54 and 53 respectively depending upon the positioning of the switch 47.

The stationary distributor head 31 has a bore 63, providing a rotating space for the conductor washers 53 and 54, and has a threaded bore 64 engaging a similar thread, upon the flange portion 65, of the bracket 66 having a bore 67 for the free rotation of the shaft 51 therein.

The front end, of the stationary distributor head 31, is covered by an insulating cover 70 screwed thereto as indicated at 71.

Variously disposed, around the circumference of the distributor head 31, are contacts 201, 202, 203, 204, 205, 206, 401, 402, and 403, and since their arrangement and interconnecting conduits are too difficult to show, in the Figs. 3 and 4, I provide Fig. 5, which is a straight line development of the outer circumference of the distributor head 31.

The distributor head 31 has a row of angularly disposed contacts 201, 203, 204, 205 and 206 spaced 60° apart and swept by the spark lead off extension 56 transferring the high tension current thereto in their numerical order. Since the extension 56 travels at half crank-shaft speed, the spacing of 60° becomes relatively 120° of the crank shaft rotation and we therefore connect contacts 201, 202 and 203 with the contacts 204, 205 and 206 respectively.

Another row of angularly disposed contacts 401, 402 and 403 are spaced 120° apart and swept by the spark lead off extension 55 transferring the high tension current thereto in their numerical order. Since the extension 55 travels at half crank-shaft speed, the spacing of 120° becomes relatively 240° of the crank-shaft rotation.

In other words, the 200 series contacts allow every cylinder to be sparked for every revolution of the crank-shaft and the 400 series contacts allow every cylinder to be sparked only during two revolutions of the crank-shaft.

Investigation, of Fig. 1, indicates that, whenever we change the sparking from one crank shaft revolution to that of two revolutions, we must also change the firing sequence in order to get uniform angularity. This is accomplished by means of connecting contacts 401, 402 and 403 to contacts 201, 203 and 205 respectively.

Whenever the 200 series contacts distribute the high tension current, the firing order, of the cylinders, is A—B—C—A—B—C—A. Whenever the 400 series contacts distribute the high tension current, the firing order, of the cylinders, becomes A—C—B—A.

Fig. 6 illustrates, diagrammatically, the crank system of a four cylinder in line 180° crank angle two stroke cycle engine, in which the normal firing order would be AD—BC—AD—BC—AD. The use of my invention, at low speeds, would transform the firing order to A—B—D—C—A.

Fig. 7 illustrates, diagrammatically, the crank system of a five cylinder radial two stroke cycle engine, in which the normal firing order would be A—B—C—D—E—A—B—C—D—E—A. The use of my invention, at low speeds, would transform the firing order to A—C—E—B—D—A.

With the above examples, I have shown sufficient detail to enable any one, versed in the art, to apply the invention to various engines.

The invention has particular utility on engines powering airplanes, since it is imperative that such engines be effectively throttled to low operating speeds for landing purposes and to be readily responsive to speed increase upon the demand of the pilot.

While I show a battery, as the source of spark energy, it is readily obvious that my invention could be applied to a magneto type ignition system by merely changing the conventional high tension current distribution system thereof.

In Fig. 8, I show a single lever control system, which would be particularly desirable for airplane engines. The control lever 77 oscillatable about the stationary fulcrum 78, as indicated, reciprocates the reach rod 79 fulcrumed, at 80, to the throttle arm 81 which is fastened to the throttle shaft 82 extending through the bore 83 of an engine fuel inlet conduit 84, having a throttling stop 85 and a full open stop 86 contacted by the throttle arm 81 during its extreme movements.

Mounted upon the throttle shaft 82 and within the bore 87, of the inlet fuel conduit 84, is a butterfly valve 88 the movement of which regulates the volumetric fluel flow through the conduit 84, which might be the outlet of a conventional carburetor system.

Depending, from the control lever 77, is a link 90 fulcrumed at 91 to a slide shaft 92, made of insulating material, reciprocable in a housing 93 carrying contacts 94 and 95 connected to high tension current conduits 33 and 32 respectively.

Mounted, upon the slide shaft 92, is a movable contact 96, connected to the high tension current conduit 46, for making contact with the contacts 94 and 95 during movement of the slide shaft 92. The system is shown in position for maximum fuel feed and for two stroke cycle firing of the various cylinders of an engine.

Whenever the pilot desires to land, he would move the control lever 77 to the left thereby throttling the engine and reducing its speed. At some given time he would move the control lever 77 to its extreme left position and the fuel feed would then be full throttled, within limits, and the contacts 94 and 96 would be engaged whereby the firing, of the various cylinders, would be of the four stroke cycle and a differing sequence as heretofore explained.

At 98 I provide a single throw single pole switch which allows the cylinder firings to be of the two stroke cycle type and the conventional sequence, irrespective of the positioning of the control lever 77. It is particularly effective while starting the engine under reduced throttle. As soon as the engine would be speeded up, the pilot would then disengage the switch 98 allowing the firing, of the cylinders, to come under the influence of the movement of the control lever 77.

From the above it will be noted that I have provided a simple means of effectively throttling internal combustion engines, and especially those of the conventional two stroke cycle type, with the elimination of jerky operation, back fires and exhaust explosions.

While the drawings show, and the specification explains, a particular embodiment of the invention, it is understood that various modifications may be employed without departing from the spirit and scope of the invention, which is to be limited only on the following claims.

I claim:

1. A sparking system, for multi-cylinder internal combustion engines, comprising, in combination, timing means making and breaking a primary electric current circuit, transformer means translating the primary current to a secondary current, distributor means distributing the secondary current, to the cylinders, in a certain operative sequence and means to shift the aforesaid sequence to a differing sequence.

2. Speed control means, for multi-cylinder internal combustion engines, comprising a movable means to control the volumetric fuel feed rate to the cylinders and means, controlled by the movable means, varying the combustion sequence, among the various cylinders, between the maximum and minimum volumetric fuel feed rates responsive to the movement of the said movable means, and means, operated at will, to maintain a given combustion sequence irrespective of the volumetric fuel feed rate governed by the said movable means.

3. In a multi-cylinder two stroke cycle internal combustion engine supplied with fuel and air to the power cylinders at every alternate stroke of the pistons reciprocating within the cylinders, the combination of, a spark plug within each cylinder, means to produce an igniting spark, at each spark plug, at every alternate stroke of the particular piston and in a given sequential cylinder firing order, and means, manually selective, omitting every alternate sparking, of the spark plugs, and varying the sequential cylinder firing order.

ANTHONY F. HOESEL.